Oct. 19, 1965
L. T. COPE
3,212,279
PROCESS FOR TRANSFERRING CARBON DIOXIDE
Filed April 28, 1964
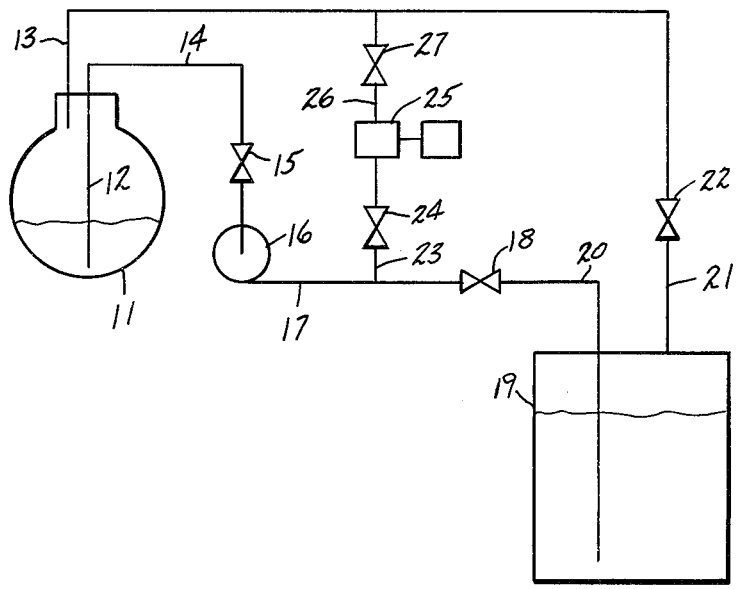
INVENTOR.
LOUIS T. COPE
BY
AGENT 3,212,279
Patented Oct. 19, 1965

3,212,279
PROCESS FOR TRANSFERRING CARBON DIOXIDE
Louis T. Cope, Chattanooga, Tenn., assignor to Olin Mathieson Chemical Corporation
Filed Apr. 28, 1964, Ser. No. 363,254
1 Claim. (Cl. 62—54)

This invention relates to a method for the transfer of liquid and gaseous carbon dioxide from a first container to a second container, the carbon dioxide in the first container having initially a maximum temperature of 10° F. and a maximum pressure of 350 p.s.i.g. The first container can suitably be a shipping container, for example, a tank car or tank truck and the second container may be a storage tank, frequently considerably larger than a tank car.

Carbon dioxide is shipped in insulated tank cars and tank trucks, originally loaded at a low temperature, for example, —50° F. At destination, the cars are unloaded into larger liquid carbon dioxide storage containers. Carbon dioxide is commonly stored in bulk storage plants throughout the country under a pressure usually in the range of from 280 to 305 p.s.i.g. and at a temperature of about 0° F. The containers are insulated and refrigerated to maintain these conditions. Various pumps are known to the art for the purpose of transferring liquid carbon dioxide from tank cars to such storage container. Using only such liquid transfer pumps, the liquid contents of the tank cars are readily removed but the cars remain filled with saturated carbon dioxide vapor at elevated pressure which is usually not unloaded. In a 43 ton capacity tank car, for example, approximately 4000 pounds of saturated gas remains in the tank car after all the liquid is pumped out. Freight must be paid on the residual weight as it travels in both directions. U.S. Patent 1,853,983 issued April 12, 1932 to Leach, assignor to Mathieson Alkali Works and U.S. Patent 2,729,948 issued January 10, 1956 to Northgraves, assignor to Olin Mathieson Chemical Corporation, show systems for unloading liquefied gases from tank cars. Both systems leave the tank car filled with gas under pressure when liquid is completely removed. With suitable expensive equipment, the gaseous contents of the tank cars can be recovered but in most locations such expensive equipment is ordinarily not available. The cost of suitable equipment available to the prior art, including means for removing the residual gas and liquefying it, costs more than three times the cost of the equipment for the practice of the present invention. The present invention provides a simple and economical method and apparatus for recovering the carbon dioxide vapor remaining in the tank car after unloading the liquid. Using the process and apparatus of this invention substantially all of the carbon dioxide can be removed from a tank car. The system provided by this invention is simple, transfer of both liquid and gaseous carbon dioxide is rapid and more complete and the cost of the apparatus is only about $1,000.

The apparatus required for the practice of the process of the present invention consists of a liquid transfer pump, a storage container, a compressor and suitable valves and conduits. The compressor is suitably equipped with an oil separator, filter pressure controls and suitable valves and fittings.

The figure shows an apparatus for transferring carbon dioxide liquid and gas from tank car 11 to storage container 19. Liquid conduit 12 leads from the bottom of tank car 11 via line 14 controlled by valve 15 to pump 16 which transfers liquid carbon dioxide through lines 17 and 20 controlled by valve 18 to a point below the liquid level in storage container 19. During the transfer of liquid carbon dioxide, gaseous carbon dioxide is transferred via line 21 controlled by valve 22 and via line 13 to tank car 11 to displace the liquid carbon dioxide removed.

When substantially all of the liquid has been removed from tank car 11, valves 15 and 22 are closed and compressor 25 is attached on the suction side to tank car 11 via vapor line 13. Valves 24 and 27 are opened and compressor 25 is started, removing gaseous carbon dioxide via lines 13 and 26. On the discharge side, compressor 25 delivers the compressed gas through lines 23 and 20 to a point below the level of the cold liquid in storage container 19 where the compressed gas is largely condensed to liquid carbon dioxide. If desired, the compressed carbon dioxide gas may be delivered below the liquid level through a sparging device (not shown) in order to condense the vapor more effectively to liquid. When the operation is completed, valves 18, 24 and 27 are closed, compressor 25 is stopped and lines 13 and 14 are detached from the tank car.

Usually the liquid contents of the tank car are at a significantly lower temperature than the temperature of the storage container. Liquid transfer reduces the temperature in the storage container. It is a particular feature of the process of this invention that the refrigeration available in the liquid is utilized as condenser for the gas removed from the tank car and compressed. The heat introduced into the gas by compression is removed by the refrigeration available in the liquid transferred from the first container to the storage container. It is a particular advantage of the present invention that no condenser or refrigerating equipment is necessary. Material savings in equipment and operating costs are thus effected.

*Example*

An insulated tank car was loaded with liquid and gaseous carbon dioxide to 85,500 pounds at a temperature of —50° F. At the point of receipt, when unloading started, the pressure was 234 p.s.i.g. and the temperature was —12° F. Using a liquid transfer pump in a system substantially as shown in FIGURE 1, the liquid carbon dioxide was transferred from the tank car to a 60 ton storage tank in four hours. The volume of the liquid removed from the tank car was replaced by gaseous carbon dioxide flowing from the storage tank to the tank car. When substantially all of the liquid carbon dioxide had been pumped from the tank car, the valves in the liquid line from the tank car and in the vapor line from the storage tank were closed and the liquid transfer pump was shut down. There remained in the tank car about 4000 pounds of saturated carbon dioxide gas. The compressor was started to remove gaseous carbon dioxide from the tank car. When the compressor was started, the tank car pressure and storage tank pressure were equalized at 250 p.s.i.g. and the temperature in the tank car was 9° F. The gas was compressed and delivered below the surface of the liquid carbon dioxide in the storage tank. After 3 hours, the pressure in the tank car was reduced to 60 p.s.i.g. and the carbon dioxide gas remaining in the tank car was 500 to 600 pounds. All the valves were closed and the liquid and vapor lines to the tank car were detached. The compressor can be operated until the tank car pressure is atmospheric or less but it is desirable to leave sufficient residual pressure that no in-leakage of air can occur on the return trip to contaminate the carbon dioxide.

What is claimed is:
Process for transferring liquid and gaseous carbon dioxide from a first container to a second container, the carbon dioxide in said first container being at a tempera- ture below 10° F. and at a pressure below 350 p.s.i.g. by the steps of:
 (a) pumping substantially all of the liquid carbon dioxide from said first container to said second container while transferring gaseous carbon dioxide from said second container to said first container,
 (b) withdrawing gaseous carbon dioxide from said first container, compressing the withdrawn carbon dioxide and introducing the compressed carbon dioxide below the surface of the liquid carbon dioxide in said second container whereby said compressed carbon dioxide is cooled and liquefied.

References Cited by the Examiner

UNITED STATES PATENTS

| | | | |
|---|---|---|---|
| 2,854,826 | 10/58 | Johnston | 62—55 |
| 2,956,413 | 11/60 | Jensen et al. | 62—51 |
| 3,106,827 | 10/63 | Schlumberger | 62—51 |
| 3,112,617 | 12/63 | Tafreshi | 62—55 X |
| 3,150,495 | 9/64 | Reed | 62—54 |

ROBERT A. O'LEARY, *Primary Examiner.*